United States Patent
Kamoi (10) Patent No.: US 10,157,025 B2
(45) Date of Patent: Dec. 18, 2018

(54) IMAGE FORMING APPARATUS, METHOD OF CONTROLLING THE SAME, INFORMATION PROCESSING APPARATUS, AND STORAGE MEDIUM

(71) Applicant: CANON KABUSHIKI KAISHA, Tokyo (JP)

(72) Inventor: Keiko Kamoi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/635,714

(22) Filed: Jun. 28, 2017

(65) Prior Publication Data

US 2018/0032288 A1 Feb. 1, 2018

(30) Foreign Application Priority Data

Aug. 1, 2016 (JP) .................................. 2016-151520

(51) Int. Cl.
  *G06F 15/00* (2006.01)
  *G06F 3/12* (2006.01)
  *H04N 1/00* (2006.01)

(52) U.S. Cl.
  CPC ............ *G06F 3/1205* (2013.01); *G06F 3/121* (2013.01); *G06F 3/1207* (2013.01); *G06F 3/1222* (2013.01); *G06F 3/1238* (2013.01); *G06F 3/1285* (2013.01); *H04N 1/00015* (2013.01); *H04N 1/00047* (2013.01); *H04N 1/00053* (2013.01); *H04N 1/00076* (2013.01); *H04N 1/00413* (2013.01); *H04N 2201/0082* (2013.01); *H04N 2201/0094* (2013.01)

(58) Field of Classification Search
  CPC ........... H04N 1/00204; H04N 1/00384; H04N 2201/0094; H04N 1/00811; H04N 1/00411
  USPC ....................................................... 358/1.13
  See application file for complete search history.

(56) References Cited

U.S. PATENT DOCUMENTS 9,560,230 B2 1/2017 Kamoi
2014/0368854 A1* 12/2014 Iwadate ............... G06K 15/027
                                                              358/1.13

FOREIGN PATENT DOCUMENTS

JP          2015-002372 A       1/2015

* cited by examiner

*Primary Examiner* — Saeid Ebrahimi Dehkord
*Assistant Examiner* — Saeid Ebrahimi Dehkordy
(74) *Attorney, Agent, or Firm* — Venable LLP (57) ABSTRACT

Determination is made as to whether or not image data inputted in a state where a mode for confirming a print result is set in a maintenance mode used by a service person includes information that indicates data for maintenance, and in a case that it is determined that the information is included, image formation is performed after superimposing a particular pattern on the image data, and in a case that it is determined that the information is not included, image formation in accordance with the image data is performed after waiting for the mode to be released.

10 Claims, 7 Drawing Sheets

START COPYING: START KEY

NUMBER OF COPIES: 1
SHEET : CASSETTE 1
　　A4 : PLAIN PAPER
PAGE AGGREGATION : OFF
DOUBLE-SIDED : OFF
SCALING : 100%

FIG. 4B 400

START COPYING: START KEY
CONFIRMATION-PRINT MODE

NUMBER OF COPIES: 1
SHEET : CASSETTE 1
　　A4 : PLAIN PAPER
PAGE AGGREGATION : OFF
DOUBLE-SIDED : OFF
SCALING : 100%

FIG. 4C

MAINTENANCE MODE MENU

ERROR HISTORY
VERSION INFORMATION
COUNTER INFORMATION
IMAGE ADJUSTMENT
CONFIRMATION-PRINT MODE SETTING
TEST PRINT

MAINTENANCE MODE MENU

ERROR HISTORY
VERSION INFORMATION
COUNTER INFORMATION
IMAGE ADJUSTMENT
CONFIRMATION-PRINT MODE RELEASE
TEST PRINT

IMAGE FORMING APPARATUS, METHOD OF CONTROLLING THE SAME, INFORMATION PROCESSING APPARATUS, AND STORAGE MEDIUM

BACKGROUND OF THE INVENTION

Field of the Invention

The present invention relates to an image forming apparatus, a method of controlling the same, an information processing apparatus, and a storage medium.

Description of the Related Art

Conventionally, in an image forming apparatus provided with a copy function and a print function, to inhibit users from pretending to be a service person to print without being charged, there are apparatuses provided with a mode in which a service person uses the apparatus. For example, Japanese Patent Laid-Open No. 2015-2372 recites that an image forming apparatus provided with such a mode does not update a charging counter while in the mode, and prints by superimposing an image of a specific pattern onto inputted print data in the mode.

However, in the image forming apparatus of Japanese Patent Laid-Open No. 2015-2372, while in the mode in which a service person uses the apparatus, no discrimination is made as to whether inputted print data is something that the service person inputted or something that a user inputted. Therefore, while an image forming apparatus is operating in such a mode, printing is performed by superimposing an image of a specific pattern onto all print data. At a service job site, because there are cases in which work is performed while a network cable or a FAX cable remains attached to an image forming apparatus, it is envisioned that users will end up inputting print data without being aware that the image forming apparatus is operating in the mode. In such a case, the user would receive printed material of a form that they do not desire due to superimposed printing.

SUMMARY OF THE INVENTION

An aspect of the present invention is to eliminate the above-mentioned problem with conventional technology.

A feature of the present invention is to provide a technique for enabling a service person to perform printing for the purpose of maintenance without being charged, and inhibiting a user from receiving output material of a form that is not desired.

According to a first aspect of the present invention, there is provided an image forming apparatus, comprising: a memory storing a set of instructions; and one or more processors that execute instructions of the set of the instructions and cause the image forming apparatus to function as: a setting unit configured to set a mode for confirming a print result in a maintenance mode used by a service person; a determination unit configured to determine whether or not image data inputted in a state where the mode is set by the setting unit includes information indicating that the image data is data for maintenance; and a control unit configured to, in a case that the determination unit determines that the information is included, control to perform image formation after superimposing a particular pattern on the image data, and, in a case that the determination unit determines that the information is not included, control to perform image formation in accordance with the image data after waiting for the mode to be released.

According to a second aspect of the present invention, there is provided an image forming apparatus, comprising: a memory storing a set of instructions; and one or more processors that execute instructions of the set of the instructions and cause the image forming apparatus to function as: a setting unit configured to set a mode for confirming a print result in a maintenance mode used by a service person; a determination unit configured to determine whether or not image data inputted in a state where the mode is set by the setting unit includes information indicating that the image data is data for maintenance; and a control unit configured to, in a case that the determination unit determines that the information is included, control to perform image formation after superimposing a particular pattern on the image data, and, in a case that the determination unit determines that the information is not included, control to cancel image formation in accordance with the inputted image data.

According to a third aspect of the present invention, there is provided an information processing apparatus, comprising: a memory storing a set of instructions; and one or more processors that execute instructions of the set of the instructions and cause the information processing apparatus to function as: an obtainment unit configured to obtain information of an image forming apparatus via a network; a determination unit configured to determine, based on the information obtained by the obtainment unit, whether or not an operation mode of the image forming apparatus is a mode for confirming a print result while the image forming apparatus is in a maintenance mode used by a service person; a generation unit configured to generate a print job to which information indicating data for maintenance is added, in a case that the determination unit determines that the operation mode is the mode for confirming a print result; and a transmission unit configured to transmit the print job generated by the generation unit to the image forming apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Firstly explanation is given regarding a first embodiment of the present invention.

Figure 1:
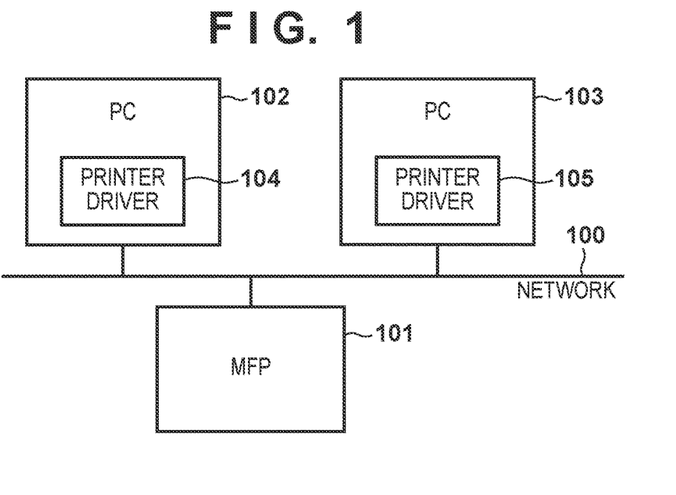
FIG. 1 is a block diagram for explaining an image forming system according to a first embodiment of the present invention.

FIG. 1 is a block diagram for explaining an image forming system according to the first embodiment of the present invention.

On a network 100, a multi-function peripheral (MFP) 101, and PCs 102 and 103 are communicably connected to each other. In the first embodiment, explanation is given with the MFP 101 as an example of an image forming apparatus, and the PC 102 as an example of an information processing apparatus. The MFP 101 and the PC 102 are connected to the Internet (not shown) via the network 100, and the MFP 101 can receive print data from the PC 102 and the PC 103.

Firstly, explanation is given regarding the PC 102. A printer driver 104 is installed in the PC 102, and by this printer driver 104, it is possible to transmit print data to an external apparatus (the MFP 101 in the first embodiment) via the network 100 and cause printing to be performed. When transmitting print data, it is possible to send it together with setting values, commands, or the like necessary for a job. A printer driver 105 is installed in the PC 103, similarly to the PC 102, and it is possible to transmit print data to the external MFP 101 via the network 100 to cause printing.

Next, explanation is given regarding the MFP 101. The MFP 101 has a reading function for reading an image on a sheet (original), and a print function for printing an image on a sheet. In addition, the MFP 101 also functions as a printer apparatus that can print received print data.

Figure 2:
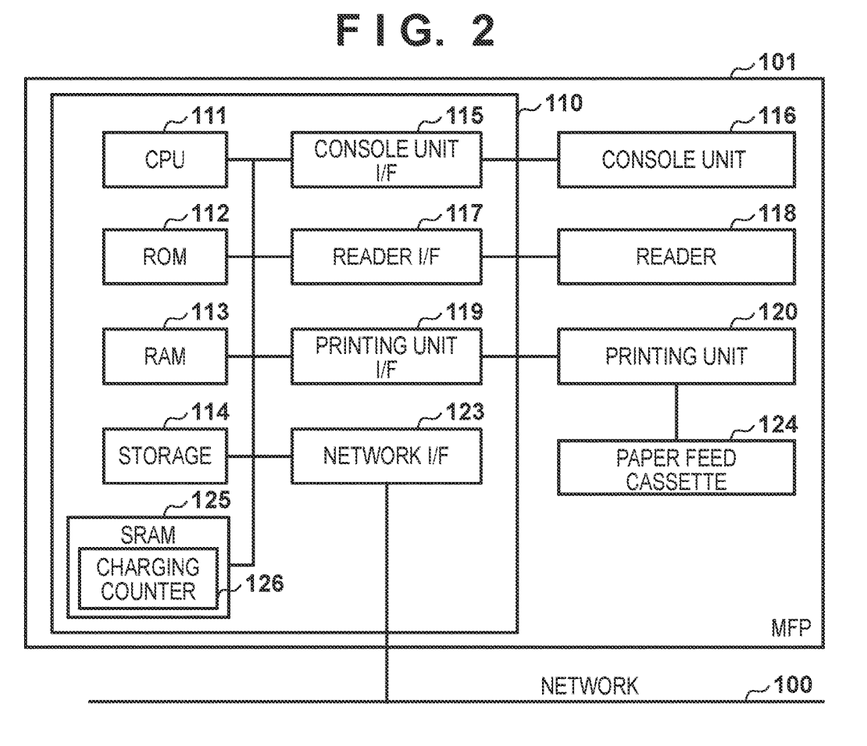
FIG. 2 is a block diagram for explaining a hardware configuration of an MFP according to the first embodiment.

FIG. 2 is a block diagram for explaining a hardware configuration of the MFP 101 according to the first embodiment.

A control unit 110 that includes a CPU 111 controls overall operation of the MFP 101. The CPU 111 deploys a control program stored in a ROM 112 or a storage 114 into a RAM 113, and performs various control such as reading control or control of printing by executing the deployed program. The ROM 112 stores a control program or the like that the CPU 111 can execute. In addition, the ROM 112 stores a boot sequence, font information, and the like. The RAM 113 is a main memory of the CPU 111, and is used as a work area, and a temporary storage area for deploying various control programs stored in the ROM 112 and the storage 114. The storage 114 stores image data, print data, various programs, and various setting information. In the first embodiment, a flash memory is envisioned as the storage 114, but an auxiliary storage apparatus such as an SSD or an HDD may be used. An SRAM 125 is a memory that can hold its storage contents even when the power supply of the MFP 101 has been turned off, and is provided with a charging counter 126.

Note that, in the MFP 101 according to the first embodiment, it is assumed that a single CPU 111 uses a single memory (the RAM 113) to execute various processing indicated in flowcharts that are described later, but other embodiments may be employed. For example, it is possible to cause a plurality of CPUs, RAMS, ROMs and storages to cooperate to execute the various processing indicated in the flowcharts that are described later. Configuration may be taken so as use a hardware circuit such as an ASIC or an FPGA to execute some processing.

A console unit I/F 115 connects a console unit 116 and the control unit 110. The console unit 116 has, as described later with reference to FIG. 3, a display unit for displaying information to a user, and an input unit for inputting an instruction from a user. Note that the display unit has a touch panel function. A reader I/F 117 connects a reader 118 and the control unit 110. The reader 118 reads an image on a sheet and converts the image to image data such as binary data. Image data generated by the reader 118 is sent to an external apparatus, or is printed to a sheet by the printing unit 120. A printing unit I/F 119 connects the printing unit 120 and the control unit 110. The CPU 111 transfers image data to be printed (image data that is the target of printing) to the printing unit 120 via the printing unit I/F 119. The printing unit 120 prints an image to a sheet fed from a paper feed cassette 124. In addition, the control unit 110 is connected to the network 100 via a network interface 123. The network interface 123 transmits information or image data to an external apparatus on the network 100, and receives information or print data from an information processing apparatus (the PC 102 or the like) that is on the network 100. As a method for transmission/reception via a network, transmission/reception that uses electronic mail, or performing transmission that uses another protocol (for example, FTP or SMB) is possible. Furthermore, the MFP 101 can also perform facsimile transmission/reception with a fax machine (not shown) via a modem (not shown) and a PSTN (not shown).

Next, a simple explanation is given regarding a mechanism for charge management in the MFP 101 which is provided with the above configuration. The MFP 101 is provided with the charging counter 126 for counting the number of sheets of print material for which a user should be charged each time printing, by the printing unit 120, of image data that is inputted from the network 100, the network interface 123, or the reader 118 is performed. Information of the number of sheets counted by the charging counter 126 can be obtained by the external PC 102, and afterwards a user of the MFP 101 is charged based on this information.

The MFP 101 according to the first embodiment has the following two operation modes. The first operation mode is an operation mode that a typical user operates to use a copy function, a print function, a scanner function, and a facsimile function. This operation mode is referred to below as a "normal mode". The second operation mode is a "service person mode" in which a service person uses the MFP 101. The service person mode is a mode for a service person to perform maintenance work. The service person mode is further classified into two operation modes: a "maintenance mode" and a "confirmation-print mode". The "maintenance mode" is a mode for a service person to perform maintenance work. Maintenance work is work for confirming or changing parameter settings when deterioration or color misregistration of a printed image has occurred, for example. In addition, maintenance work also includes work to confirm versions of software or firmware of the MFP 101, counter information for counting the number of sheets of print material that has been printed, or the like. The "confirmation-print mode" is a mode in which a service person uses a copy or a print function. The "confirmation-print mode" is, for example, used in a case where a service person performs a normal copy or print processing after adjusting the color of an image, and then confirms a printed result. Note that a copy job or a print job that is executed in this maintenance work is processed as non-charged.

The MFP 101 operates in either of the aforementioned operation modes, but operation screens displayed in each operation mode differ.

Figure 3:
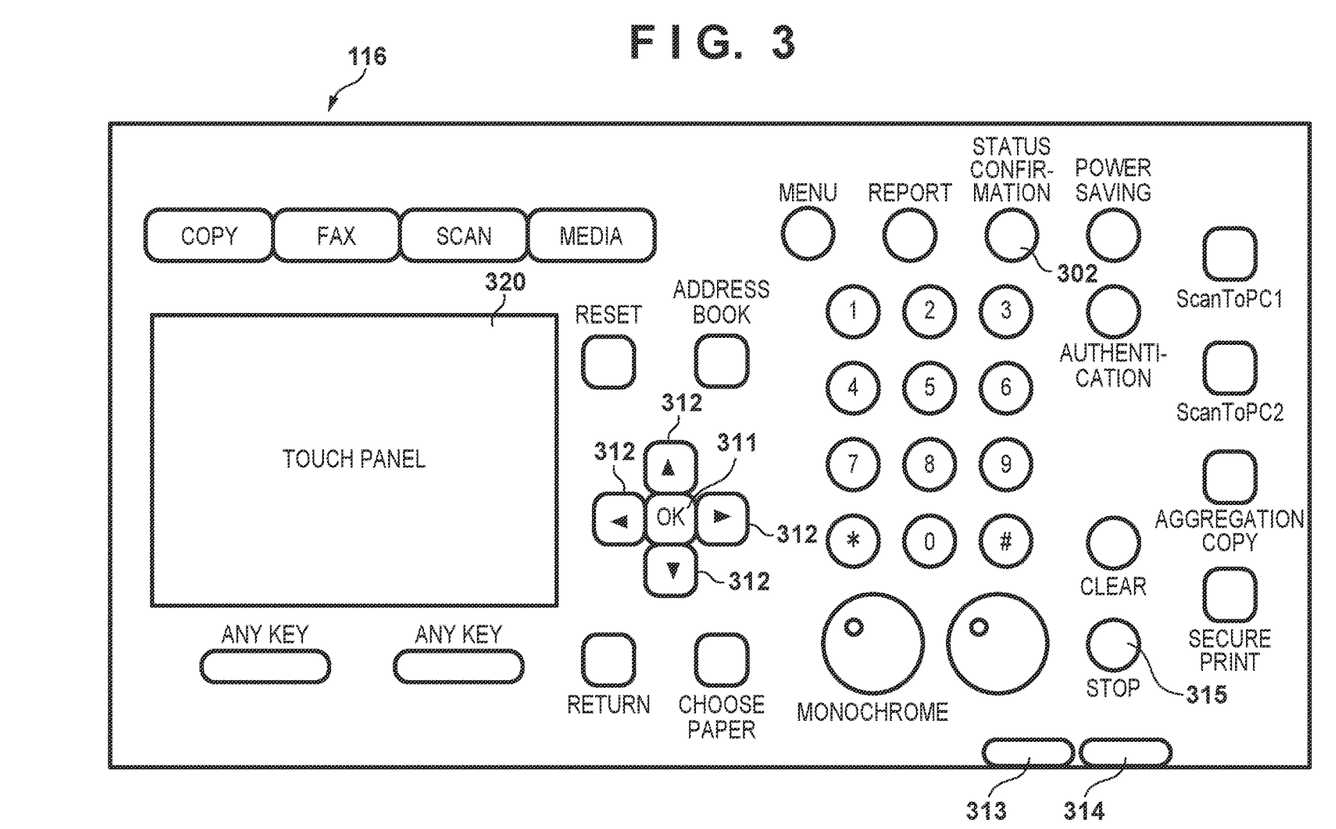
FIG. 3 depicts a perspective view of a console unit of the MFP according to the first embodiment.

FIG. 3 depicts a perspective view of the console unit 116 of the MFP 101 according to the first embodiment.

The console unit 116 has a touch panel 320 that displays an operation screen that is described later, and various hard keys. The touch panel 320 and the various physical keys accept instructions from a user. The console unit 116 is provided with a cursor keypad 312 for selecting a choice on a screen displayed on the touch panel 320, and an OK key 311 for confirming a choice selected by the cursor keypad 312. A user can use the cursor keypad 312 and the OK key 311 to select and designate one item from the choices on the screen. In addition, a user can designate a choice by directly touching a choice displayed on the touch panel 320 with a finger or an object such as a stylus.

A status confirmation key 302 is a key for making an instruction to display a screen (a status confirmation screen) for confirming the status of the MFP 101. A user can press the status confirmation key 302 to cause a status confirmation screen to be displayed on the touch panel 320, and, via this screen, confirm the status of a print job that is being executed. A lamp 313 and a lamp 314 are for notifying statuses of the MFP 101 to a user. The lamp 313 lights during reception of an electronic mail or execution of a print job, and the lamp 314 lights when some kind of error has occurred in the MFP 101. A stop key 315 enables job cancellation to be instructed, and is used when interrupting processing while data is being received or during printing.

FIGS. 4A-4D depict views for illustrating examples of operation screens displayed on the touch panel 320 of the console unit 116 of the MFP 101 according to the first embodiment.

Figure 4A:
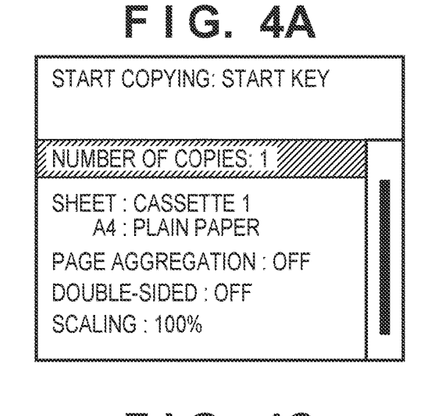
FIGS. 4A-4D depict views for illustrating examples of operation screens displayed on a touch panel of the console unit of the MFP according to the first embodiment.

FIG. 4A illustrates a main screen for the copy function in the normal mode. The main screen is configured by seven lines, and a message instructing start of the copy function is displayed on the first and second lines. The third to seventh lines display some of setting items for the copy function. Here, that the number of copies is "1", the sheet used in copying is A4 plain paper from cassette 1, page aggregation is "OFF", a double-sided print is "OFF", and scaling is full size "100%" is displayed.

Figure 4B:
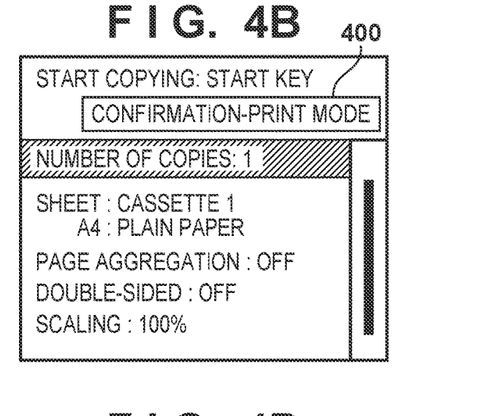

FIG. 4B illustrates a main screen for the copy function in the "confirmation-print mode". A message 400 indicating that the "confirmation-print mode" has been entered is displayed on the second line in this screen. Display of the remaining third to seventh lines is the same as with FIG. 4A. In this way, in the "confirmation-print mode", a point that the message 400 alerting that the "confirmation-print mode" has been entered being displayed on the upper part of the screen differs from the main screen of the copy function in the normal mode (FIG. 4A). By this display, it is possible for a user or a service person to confirm that the MFP 101 is currently in the "confirmation-print mode", even in a main screen such as the main screen for the copy function.

Figure 4C:
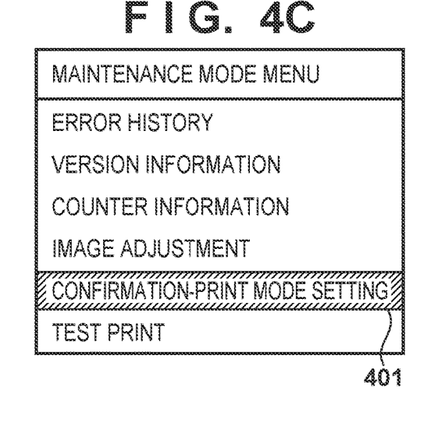
Figure 4D:
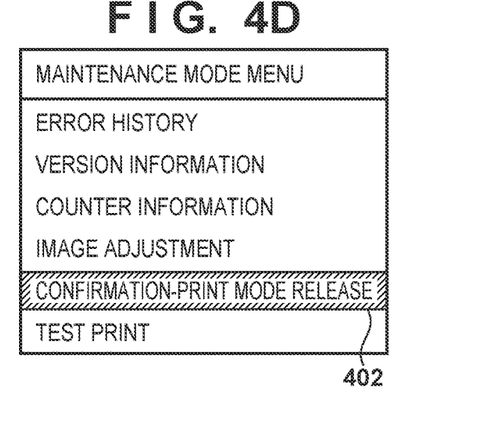

FIGS. 4C and 4D illustrate examples of maintenance mode menu screens that are displayed on the console unit 116 when the MFP 101 has entered the "maintenance mode". The MFP 101 enters the "maintenance mode" by a service person performing a special key operation via the console unit 116. For example, the "maintenance mode" is entered by a service person entering an ID and a password via the console unit 116, or performing a special operation such as a simultaneous press of a plurality of keys or a long press of a particular key provided on the console unit 116. In addition, when leaving the "maintenance mode", the normal mode or a "confirmation-print mode" is transitioned to by a service person performing a special key operation. It is presumed that such an operation is a special operation that can only be known by a service person, and is not disclosed to a common user. Note that a confirmation-print mode setting 401 is a setting item for instructing a transition to the "confirmation-print mode" from the "maintenance mode". In addition, a confirmation-print mode setting release 402 of FIG. 4D is a setting item for instructing a transition to the "maintenance mode" after leaving the confirmation-print mode.

Figure 5:
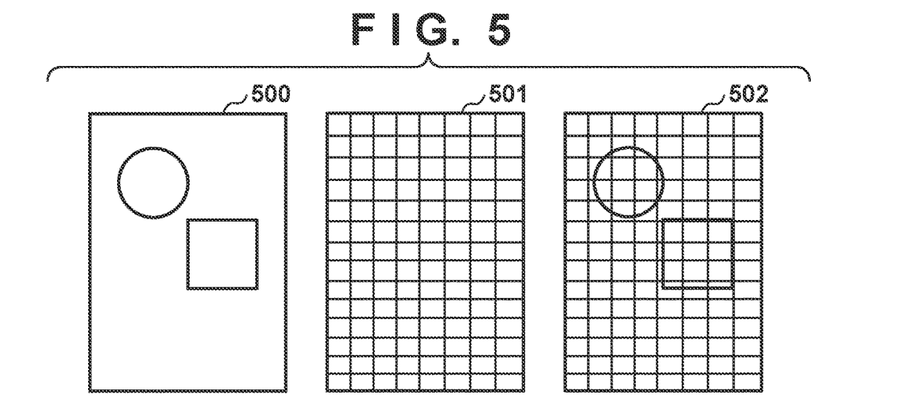
FIG. 5 depicts a view for illustrating an example of an image printed by the MFP according to the first embodiment.

FIG. 5 depicts a view for illustrating an example of an image printed by the MFP 101 according to the first embodiment.

An image 500 illustrates an example of an image printed in the normal mode. An image 501 illustrates an example of an image of a grating pattern. An image 502 illustrates an example of an image that is printed after superimposing the grating pattern image 501 onto the image 500 that is to be printed in the normal mode. In this way, in the confirmation-print mode, by superimposing for example a grating pattern that is a particular pattern on a generated image, an obtained print material is valid for maintenance but not valid as a print material that is desired by a user.

Figure 6:
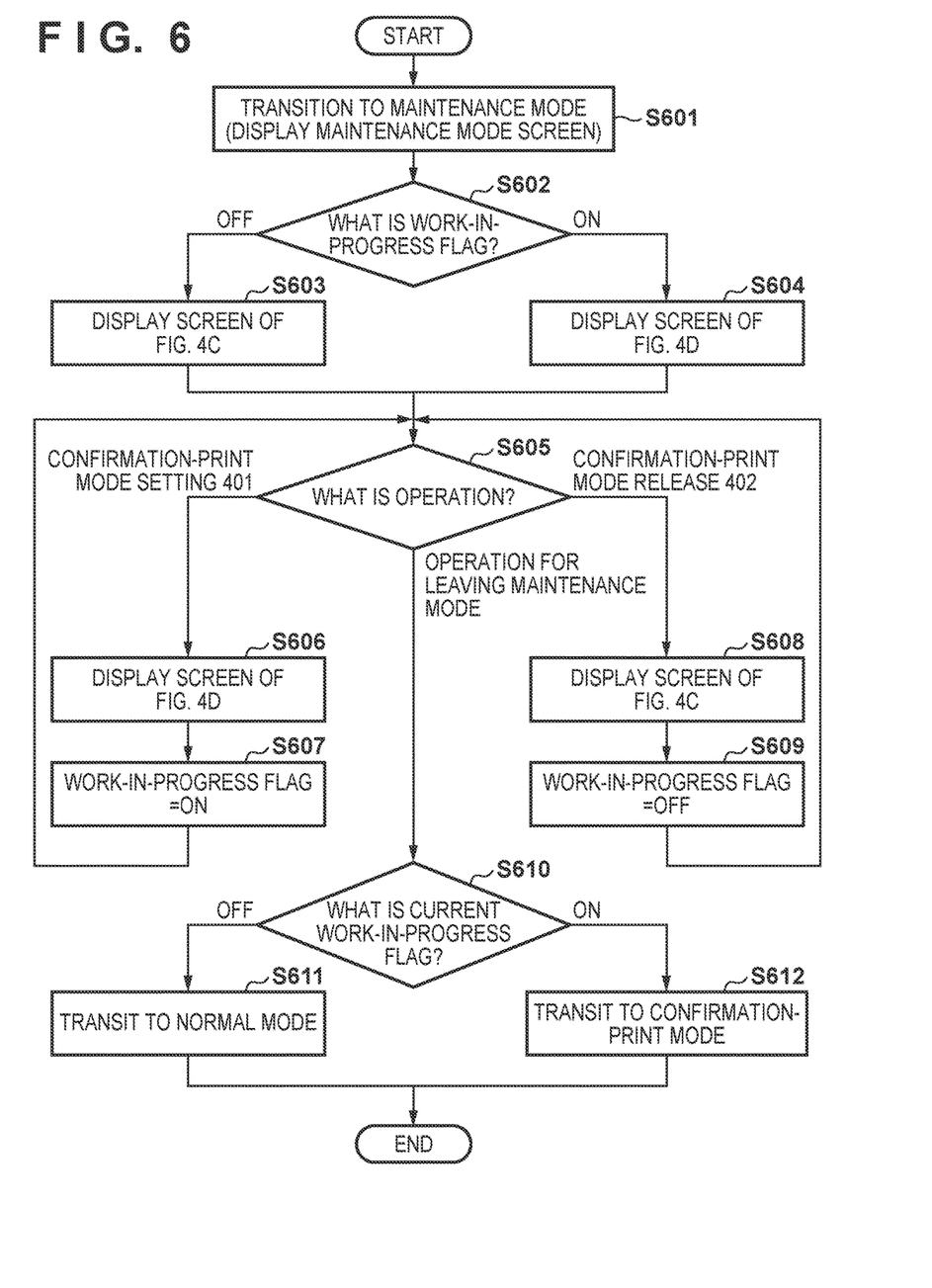
FIG. 6 is a flowchart for describing operation mode transition processing in accordance with the MFP according to the first embodiment.

FIG. 6 is a flowchart for describing operation mode transition processing in accordance with the MFP 101 according to the first embodiment. Processing explained by this flowchart is achieved by the CPU 111 executing a program deployed into the RAM 113 from the ROM 112 or the storage 114. The processing illustrated in FIG. 6 is started by a service person operating the console unit 116 of the MFP 101 to perform a special operation for entering the maintenance mode that only a service person can know, to have the MFP 101 enter the maintenance mode.

Firstly, in step S601 the CPU 111 causes the MFP 101 to transition to the maintenance mode. Next, proceeding to step S602, the CPU 111 determines whether or not a work-in-progress flag that is saved in the RAM 113 is on or off. The work-in-progress flag is a control flag for determining whether or not the confirmation-print mode is set. Note that the work-in-progress flag is initialized to off (not in the confirmation-print mode) by the CPU 111 at a time of activation of the MFP 101. Consequently, when the maintenance mode is first entered after activation, the work-in-progress flag is set to off, and thus the processing proceeds from step S602 to step S603. In step S603, the CPU 111 executes display processing for displaying the screen illustrated in FIG. 4C, and the processing advances to step S605. Meanwhile, when the CPU 111 determines that the work-in-progress flag is on, the processing advances to step S604, and the CPU 111 executes display processing for displaying the screen illustrated in FIG. 4D, and the processing advances to step S605.

In step S605, the CPU 111 determines whether an operation by a service person has been accepted via the screen of FIG. 4C or FIG. 4D that is displayed on the console unit 116, and when an operation is accepted, determines the details of that operation. Upon determining that the confirmation-print mode setting 401 has been instructed, the processing proceeds to step S606, and the CPU 111 displays the confirmation-print mode setting release 402 on the screen (FIG. 4D), and the processing advances to step S607. In step S607, the CPU 111 sets the work-in-progress flag of the RAM 113 to on (confirmation-print mode), and the processing advances to step S605.

Meanwhile, when the CPU 111 determines in step S605 that the confirmation-print mode setting release 402 has been instructed, the processing proceeds to step S608, the CPU 111 displays the confirmation-print mode setting 401 on the screen (FIG. 4C), and the processing advances to step S609. In step S609, the CPU 111 sets the work-in-progress flag of the RAM 113 to off (not the confirmation-print mode), and the processing advances to step S605.

In addition, when the CPU 111 determines in step S605 that an operation for leaving the maintenance mode has been performed, the processing proceeds to step S610. An operation for leaving the maintenance mode is performed by determining whether or not a service person has operated a key (not shown) via the console unit 116. Alternatively, configuration may also be taken such that the maintenance mode is automatically left when a time period over which a service person has performed no operation has continued for a predetermined time period. In step S610, the CPU 111 confirms the work-in-progress flag that is saved in the RAM 113, and if the work-in-progress flag is off, the processing proceeds to step S611, the normal mode is transitioned to, and this processing terminates. Meanwhile, if the work-in-progress flag is on, the processing proceeds to step S612, the confirmation-print mode is transitioned to, and this processing terminates. In such a case, as illustrated in FIG. 4B for example, the message 400 indicating that the "confirmation-print mode" has been entered is displayed on an initial screen for copying.

As explained above, a service person for the MFP 101 can perform setting of the confirmation-print mode and release of the confirmation-print mode setting with respect to the MFP, in the maintenance mode.

Figure 7:
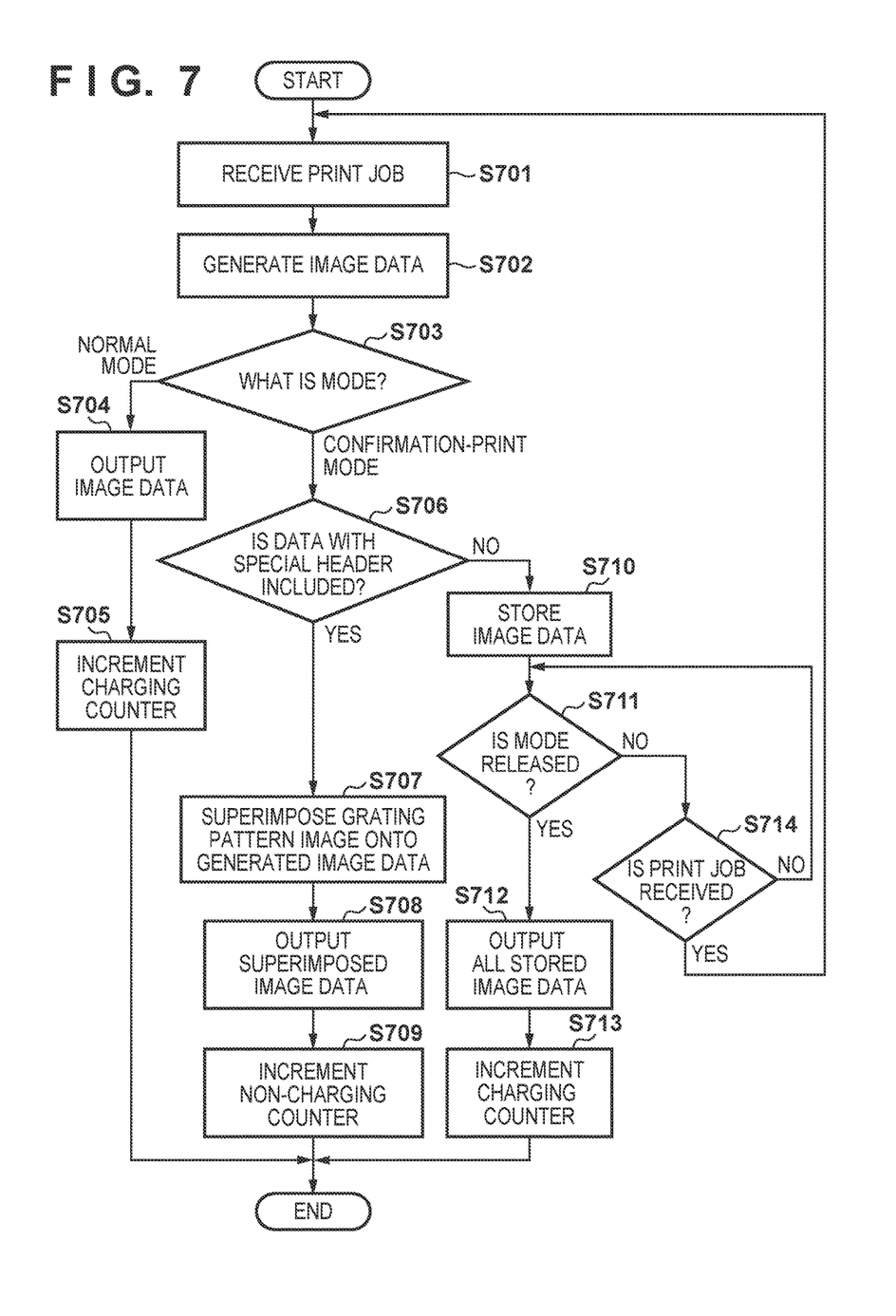
FIG. 7 is a flowchart for describing processing in which the MFP according the first embodiment receives and prints a print job.

FIG. 7 is a flowchart for describing processing in which the MFP 101 according the first embodiment receives and prints a print job. Processing illustrated by this flowchart is achieved by the CPU 111 executing a program deployed into the RAM 113 from the ROM 112 or the storage 114.

In step S701, when the CPU 111 receives a print job from a PC for example via a network, the processing advances to step S702, and image data to be printed is generated based on the received print job. Next, the processing proceeds to step S703, and the CPU 111 refers to the work-in-progress flag that is previously described to determine the status of the operation mode of the MFP 101, and if it is the normal mode, the processing advances to step S704. In step S704, the CPU 111 outputs the image data generated in step S702 to the printing unit 120 to cause it to be printed. The processing next proceeds to step S705, and the CPU 111 increments the charging counter 126, and this processing terminates. In this way, in the normal mode, image data is printed as normal irrespective of the existence or non-existence of a special header, and charging is always performed in such a case.

Meanwhile, in step S703, when the CPU 111 determines that the work-in-progress flag is on—in other words that it is in the "confirmation-print mode", the processing proceeds to step S706, and the CPU 111 determines whether or not the print job received in step S701 includes print data to which a special header is attached. When it is determined that data to which the special header is attached is included, the print job is determined to be a job that has been inputted by a service person, and the processing proceeds to step S707. In step S707, the CPU 111 superimposes the grating pattern image 501 illustrated in FIG. 5 onto the image data generated in step S702. The processing advances to step S708, and the CPU 111 outputs the image data to which the grating pattern image has been superimposed to the printing unit 120, and causes it to be printed. The processing next proceeds to step S709, and the CPU 111 increments a non-charging counter (does not perform normal charging), and this processing terminates.

Meanwhile, when the CPU 111 determines in step S706 that print data to which the special header is attached is not included, the processing proceeds to step S710, and the print job is determined to be a job inputted by a user who is not a service person, and the image data generated in step S702 is stored in the storage 114. Next, the processing proceeds to step S711, and the CPU 111 determines whether or not the setting of the "confirmation-print mode" has been released, and if it has not been released, the processing proceeds to step S714. In step S714, the CPU 111 determines whether or not a print job is received, and if it is determined that the print job is received, the processing returns to step S701 and the print job is received. Otherwise, if a print job is not received in step S714, the processing proceeds to step S711. When the CPU 111 determines in step S711 that the "confirmation-print mode" has been released, the processing proceeds to step S712, and all of the image data stored in the storage 114 is outputted to the printing unit 120 to cause it to be printed. The processing next proceeds to step S713, and the CPU 111 increments the charging counter 126, and this processing terminates.

As explained above, it is possible to identify whether image data inputted in an operation mode where a service person performs maintenance is something inputted by a service person or something inputted by a user.

By this, if image data inputted in an operation mode for performing maintenance is data inputted by a typical user, it can be printed as normal after the operation mode is released. In such a case, charging in accordance with printing is performed normally. By this, at a time of an operation mode for performing maintenance, outputting of a print material in which a particular pattern has been superimposed on the print data received from a typical user is prevented.

If image data inputted in an operation mode where a service person performs maintenance is something inputted by a service person, it is possible to obtain a printed material therefor without being charged.

In addition, when an MFP is in an operation mode where a service person performs maintenance, even when a print job from a typical user that does not include a special header is received, it is possible to wait for the release of the operation mode, and then perform normal charged printing. By this, even if this is a print job from a PC or the like that cannot execute processing in accordance with the flowchart of FIG. 9 which is described later, it is possible to perform printing appropriately.

Figure 8:
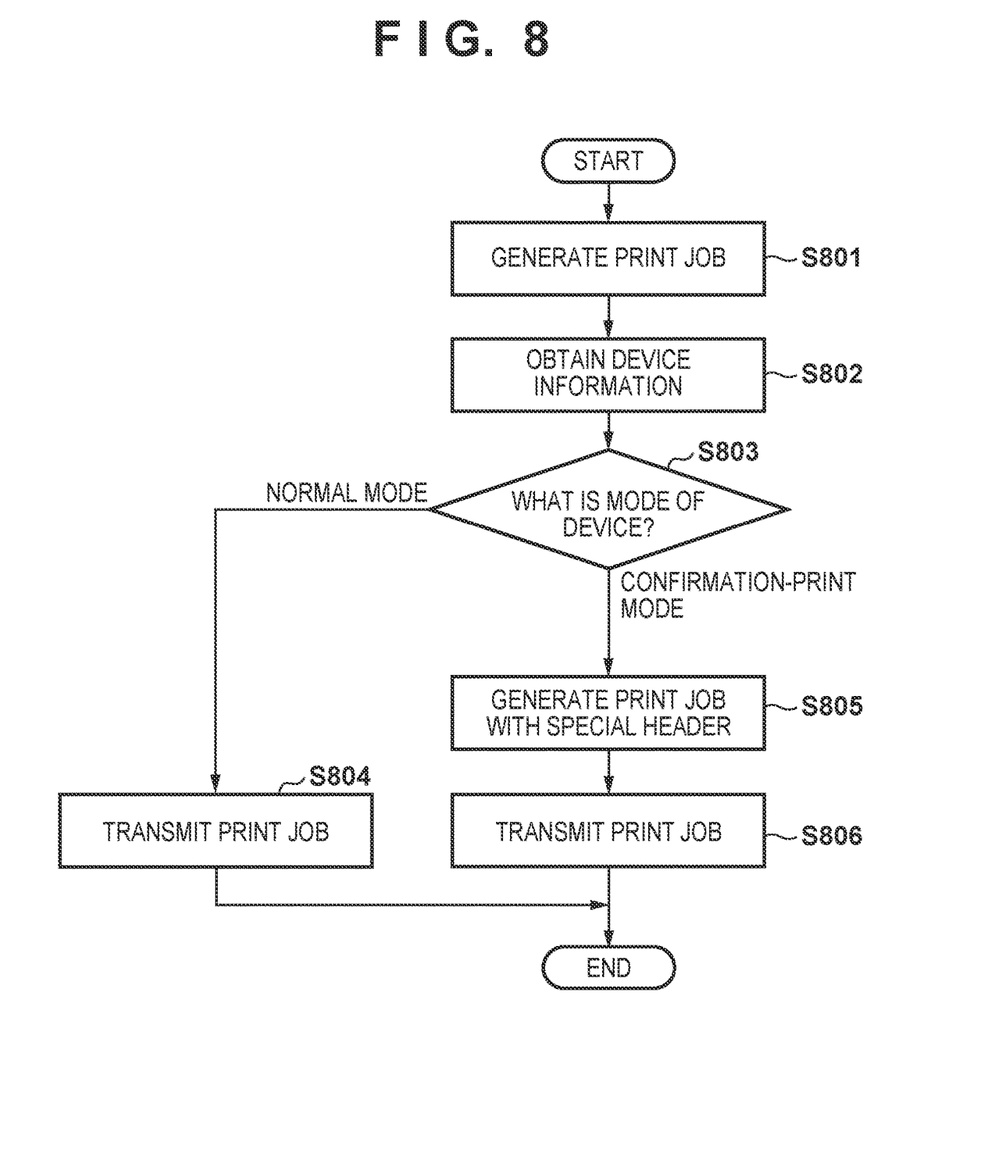
FIG. 8 is a flowchart for describing processing in which a PC according the first embodiment executes a printer driver.

FIG. 8 is a flowchart for describing processing executed by the printer driver 104 of the PC 102 according to the first embodiment.

In step S801, upon receiving a print instruction from a user via an application, the printer driver 104 generates a print job. Next, the processing proceeds to step S802, and the printer driver 104 obtains device information from the MFP 101 via the network 100. The processing proceeds to step S803, and the printer driver 104 determines the mode in which the MFP 101 is currently operating. When the MFP 101 determines it to be the normal mode, the processing proceeds to step S804, the printer driver 104 transmits the print job generated in step S801 to the MFP 101, and this processing terminates.

Meanwhile, when the printer driver 104 determines in step S803 that the MFP 101 in the "confirmation-print mode", the processing proceeds to step S805, and a print job in which the special header is added to the print job generated in step S801 is generated. The processing then proceeds to step S806, and the printer driver 104 transmits the print job generated in step S805 to the MFP 101, and this processing terminates.

Note that the special header added in step S805 is used in the determination in step S706 of FIG. 7 which is previously described, of whether it is a print job from a user or a print job issued by a service person.

As explained above, by the first embodiment, when the MFP is set to the "confirmation-print mode", a print job to which information (a header) indicating image data necessary for maintenance is attached is transmitted from a PC, and the job is printed without the user being charged. In addition, when the MFP is set to the "confirmation-print mode", if print data from a normal user (data to which a special header has not been attached) is received, the print data is temporarily stored, and after the "confirmation-print mode" is released, the print data is printed after being charged for.

Second Embodiment

Next, explanation is given regarding a second embodiment of the present invention. In the second embodiment, when the MFP 101 is set to the "confirmation-print mode", in a case where a print job to which information (a header) indicating image data necessary for maintenance is not attached is received, the print job is cancelled. Note that, because for example the system configuration of FIG. 1 and the configuration of the MFP 101 according to the second embodiment are the same as that of the first embodiment which is previously described, explanation thereof is omitted.

Figure 9:
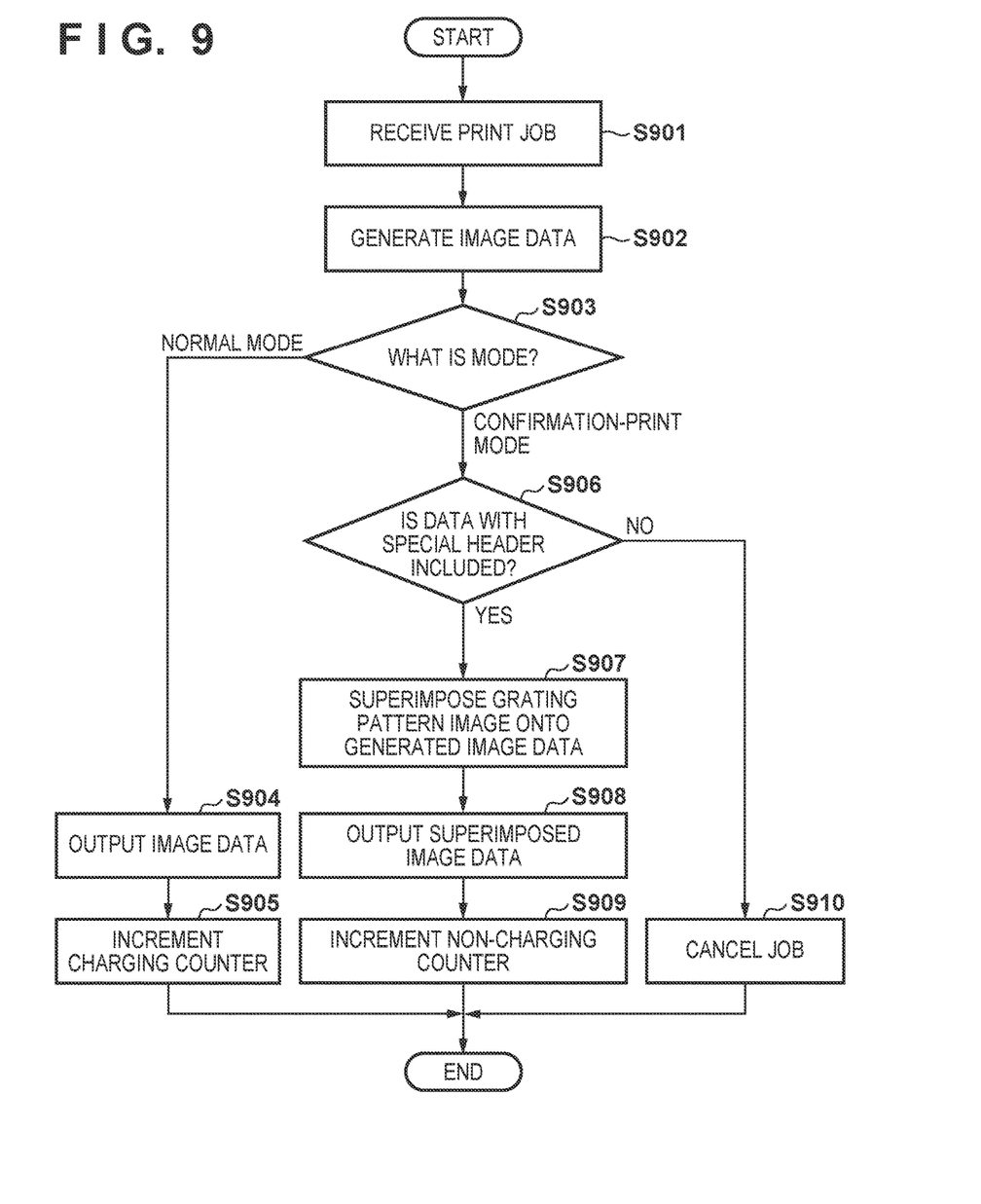
FIG. 9 is a flowchart for describing processing in which the MFP according to a second embodiment of the present invention receives and prints a print job.

FIG. 9 is a flowchart for describing processing in which the MFP 101 according to the second embodiment of the present invention receives and prints a print job. Processing illustrated by this flowchart is achieved by the CPU 111 executing a program deployed into the RAM 113 from the ROM 112 or the storage 114. Because step S901 through step S909 of FIG. 9 are the same as step S701 through step S709 of FIG. 7 of the first embodiment, explanation thereof is omitted.

In step S906, the CPU 111 determines whether or not it is a print job that includes data to which a special header is attached, and upon determining that it is not a print job that includes data to which the special header is attached, the processing proceeds to step S910, the print job received in step S901 is discarded, and this processing terminates. At this point, the CPU 111 may further notify an error to an issuing source of the print job.

Configuration may be taken such that whether or not to cancel a received print job as in the second embodiment or store it in the storage 114 as in the first embodiment previously described can be switched dependent upon the operation of a service site.

By the second embodiment, as described above, in maintenance by a service person, it is possible to prevent print material of a form that a user does not desire from being generated, and a service person can obtain desired print material without being charged.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-151520, filed Aug. 1, 2016, which is hereby incorporated by reference herein in its entirety.

What is claimed is:
1. A printing apparatus, comprising:
a printer to print an image on a sheet;
one or more memories that store a set of instructions; and
one or more processors that execute the stored instructions to:
perform counting of a number of sheets printed by the printer for which a user should be charged;
set a predetermined mode in which the counting is not performed upon execution of printing;
receive print data from an external apparatus via a network;

determine whether or not the print data received via the network in a state where the predetermined mode is set includes information indicating that the print data is data for maintenance; and in a case that it is determined that the print data includes the information, control to cause the printer to print image data based on the print data after superimposing a particular pattern on the image data, and, in a case that it is determined that the print data does not include the information, control to cause the printer not to print the image data based on the print data until the predetermined mode is released.

2. The printing apparatus according to claim 1, wherein the one or more processors execute the instructions to, in a case that it is determined that print data does not include the information, controls to cause the printer to print the image data based on the print data in accordance with having the predetermined mode been released.

3. The printing apparatus according to claim 2, wherein the one or more processors execute the instructions to, in a case that it is determined that the print data does not include the information, store the received print data in a storage apparatus, and cause the printer to print image data based on the print data stored in the storage unit in accordance with having the predetermined mode been released.

4. The printing apparatus according to claim 1, wherein the one or more processors execute the instructions to, during the printing apparatus is operating in a maintenance mode in which a service person performs a maintenance operation of the printing apparatus, in a case that the predetermined mode is not set, display a screen that includes a setting item for setting the predetermined mode, and in a case that the predetermined mode is set, display a screen that includes a setting item for releasing the setting of the predetermined mode.

5. A printing apparatus, comprising:
a printer to print an image on a sheet;
one or more memories that store a set of instructions; and
one or more processors that execute the stored instructions to:
perform counting of a number of sheets printed by the printer for which a user should be charged;
set a predetermined mode in which the counting for charging is not performed in accordance with the execution of printing by the printer;
receive print data from an external apparatus via a network;
determine whether or not print data received via the network in a state where the predetermined mode is set includes information indicating that the print data is print data for maintenance; and
in a case that it is determined that the print data includes the information, control to cause the printer to print after superimposing a particular pattern on image data based on the print data, and, in a case that it is determined that the print data does not include the information, control to cancel printing of the print data.

6. The printing apparatus according to claim 5, wherein the one or more processors execute the instructions to notify an error to a transmission source of the print data.

7. A method of controlling an image forming apparatus including at least one processor, the method comprising:
printing images on one or more sheets;
counting, by the at least one processor, a number of sheets printed for which a user should be charged;
setting a predetermined mode in which the counting is not performed upon execution of printing;
receiving print data from an external apparatus via a network;
determining, by the at least one processor, whether or not the print data received via the network in a state where the predetermined mode is set includes information indicating that the print data is data for maintenance;
in a case that it is determined that the print data includes the information, controlling by the at least one processor to cause the printer to print image data based on the print data after superimposing a particular pattern on the image data; and
in a case that it is determined that the print data does not include the information, controlling by the at least one processor to cause the printer not to print the image data based on the print data until the predetermined mode is released.

8. A method of controlling an image forming apparatus including at least one processor, the method comprising:
printing images on one or more sheets;
counting, by the at least one processor, a number of sheets printed for which a user should be charged;
setting a predetermined mode in which the counting is not performed upon execution of printing;
receiving print data from an external apparatus via a network;
determining, by the at least one processor, whether or not the print data received via the network in a state where the predetermined mode is set includes information indicating that the print data is data for maintenance;
in a case that it is determined that the print data includes the information, controlling by the at least one processor to cause the printer to print after superimposing a particular pattern on image data based on the print data; and
in a case that it is determined that the print data does not include the information, controlling by the at least one processor to cancel printing of the print data.

9. A non-transitory computer-readable storage medium storing a program for causing a processor to execute a method of controlling an image forming apparatus, the method comprising:
printing images on one or more sheets;
counting a number of sheets printed for which a user should be charged;
setting a predetermined mode in which the counting si not performed upon execution of printing;
receiving print data from an external apparatus via a network;
determining whether or not the print data received via the network in a state where the predetermined mode is set includes information indicating that the print data is data for maintenance;
in a case that it is determined that the print data includes the information, controlling to cause the printer to print image data based on the print data after superimposing a particular pattern on the image data; and
in a case that it is determined that the print data does not include the information, controlling to cause the printer not to print the image data based on the print data until the predetermined mode is released.

10. A non-transitory computer-readable storage medium storing a program for causing a processor to execute a method of controlling an image forming apparatus, the method comprising:

printing images on one or more sheets;

counting a number of sheets printed for which a user should be charged;

setting a predetermined mode in which the counting is not performed upon execution of printing;

receiving print data from an external apparatus via a network;

determining whether or not the print data received via the network in a state where the predetermined mode is set includes information indicating that the print data is data for maintenance;

in a case that it is determined that the print data includes the information, controlling to cause the printer to print after superimposing a particular pattern on image data based on the print data; and in a case that it is determined that the print data does not include the information, controlling to cancel printing of the print data.

* * * * *